Figure 1:
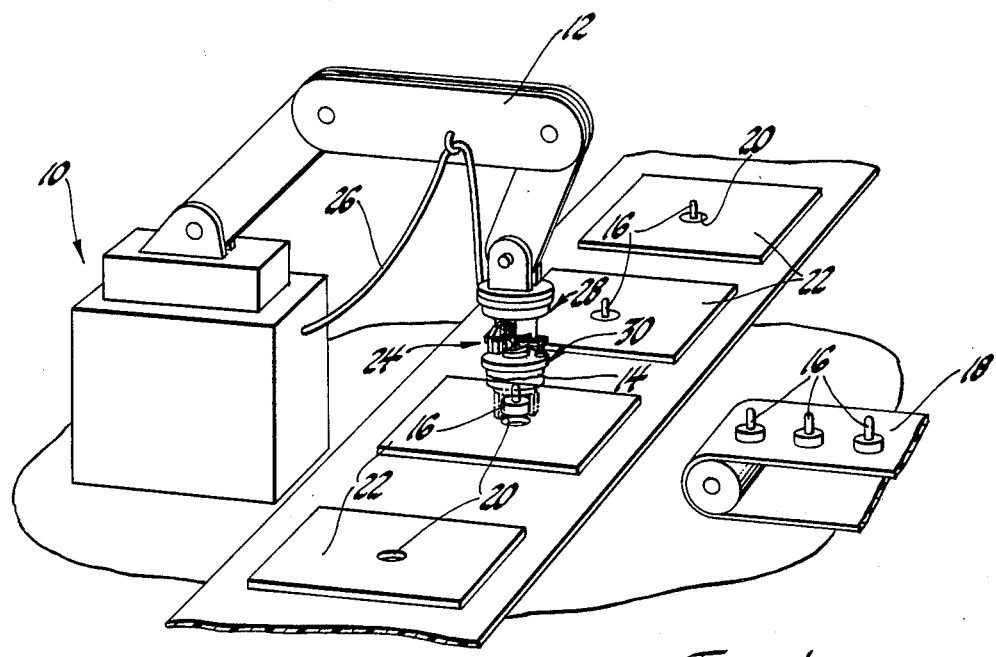

United States Patent [19]

Hamilton et al.

[11] Patent Number: 4,573,271

[45] Date of Patent: Mar. 4, 1986

[54] MACHINE PERFORMANCE SENSOR

[75] Inventors: Kent R. Hamilton, West Alexandria; John H. Kramer, Miamisburg, both of Ohio

[73] Assignee: General Motors Corporation, Detroit, Mich.

[21] Appl. No.: 589,659

[22] Filed: Mar. 14, 1984

[51] Int. Cl.[4] .............................................. G01B 5/00
[52] U.S. Cl. ................................ 33/169 C; 33/185 R; 901/45; 901/9
[58] Field of Search ....................... 901/45, 46, 30, 33, 901/34, 9; 414/730, 735; 73/862.04; 318/568; 33/169 C, 172 D, 181 R, 185 R

[56] References Cited

U.S. PATENT DOCUMENTS

| | | | |
|---|---|---|---|
| 3,824,674 | 7/1974 | Inoyama et al. | 901/34 X |
| 3,984,006 | 10/1976 | Takeyasu et al. | 901/34 X |
| 4,179,783 | 12/1979 | Inoyama et al. | 901/46 X |
| 4,283,153 | 8/1981 | Brendamour | 901/45 X |
| 4,316,329 | 2/1982 | Watson | 901/34 X |
| 4,328,621 | 5/1982 | Benjamin | 901/46 X |

Primary Examiner—Robert J. Spar
Assistant Examiner—Dennis Williamson
Attorney, Agent, or Firm—Warren D. Hill

[57] ABSTRACT

A robot or other manipulator has an end effector useful for gripping a part and performing an assembly operation to a second part, the assembly requiring, for example, an insertion and a rotation motion. A sensor is mounted between the manipulator and the end effector and comprises a pair of telescoping sections mounted for relative axial and rotational movement with springs for normally inhibiting any movement beyond a range caused by normal assembly forces. An excessive force caused by the failure of the parts to join normally results in a relative axial or rotational movement which is sensed by one or more cam operated switches. The switches are arranged to yield a plurality of signals which contain coded information on the specific type of overload movement. The information can be used by a robot or manipulator controller to stop the assembly operation and then to make the appropriate movements to solve the problem or to simply indicate to an operator the type of malfunction. The sensor utility is not limited to assembly applications, but can detect excessive force or movement in other automatic operations.

2 Claims, 6 Drawing Figures

MACHINE PERFORMANCE SENSOR

This invention relates to a sensor for determining the improper performance of a manipulator and more particularly to such a sensor useful with a robot or other manipulator to detect an abnormal assembly operation.

A robot or manipulator moving through a planned path to perform some function may encounter resistance to its intended motion perhaps due to an obstacle in the path or a misalignment of parts. This could cause damage to the machine or to the parts. Further, the checking of assembly work performed by automatic machines heretofore required the use of a dedicated probe or check stations which are used to check for proper part assembly after each assembly operation. When using robots or other kinds of controlled manipulators to do assembly work, it is necessary to provide this kind of assembly checking as well as to prevent damage to the manipulator and tooling during the assembly process. The use of dedicated stations to check for proper assembly by robots or other manipulators adds additional cost to an assembly line and does not lend itself to flexible assembly techniques.

It is therefore an object of the invention to provide a device integrated with the manipulator to check for proper assembly of parts and to provide protection for the manipulator and tooling. It is another object of the invention to provide a sensor mounted on a manipulator to detect abnormal loads. It is a further object of the invention to provide such a device which is compact, lightweight and which yields information which is readily interpreted to indicate abnormal performance and the type of abnormality.

The invention is carried out by providing a sensor coupled between a manipulator and an end effector, which sensor comprises input and output sections arranged for relative motion in each degree of freedom being monitored, springs or restraints for limiting relative motion until normal load levels are exceeded and a switch arrangement operated upon the relative motion of the input and output sections for signalling that a normal load level is exceeded. The invention further comprehends a switching arrangement including a plurality of cam operated switches which together indicate the type and direction of abnormal relative motion.

Figure 2:
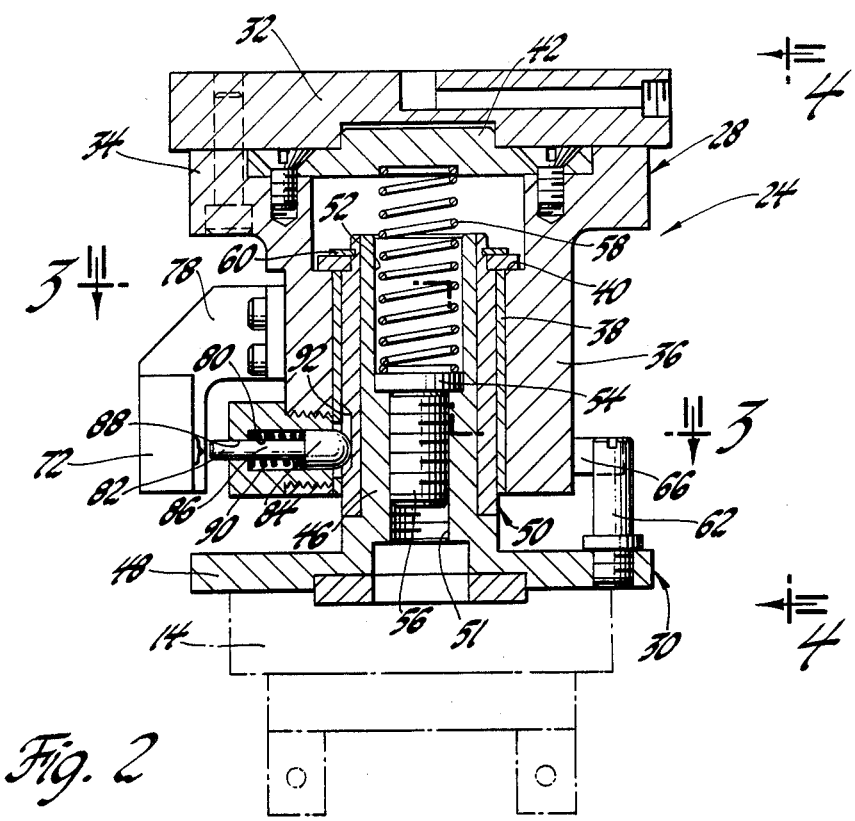
Figure 3:
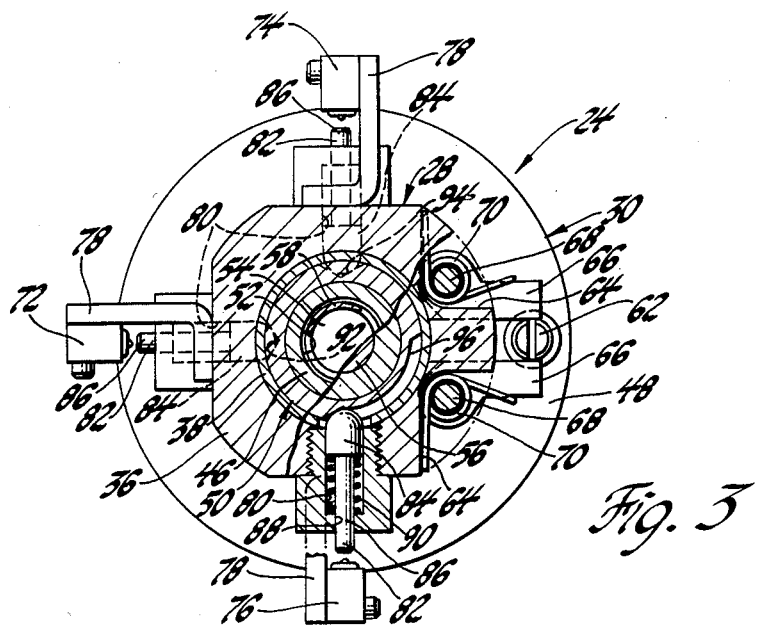
Figure 4:
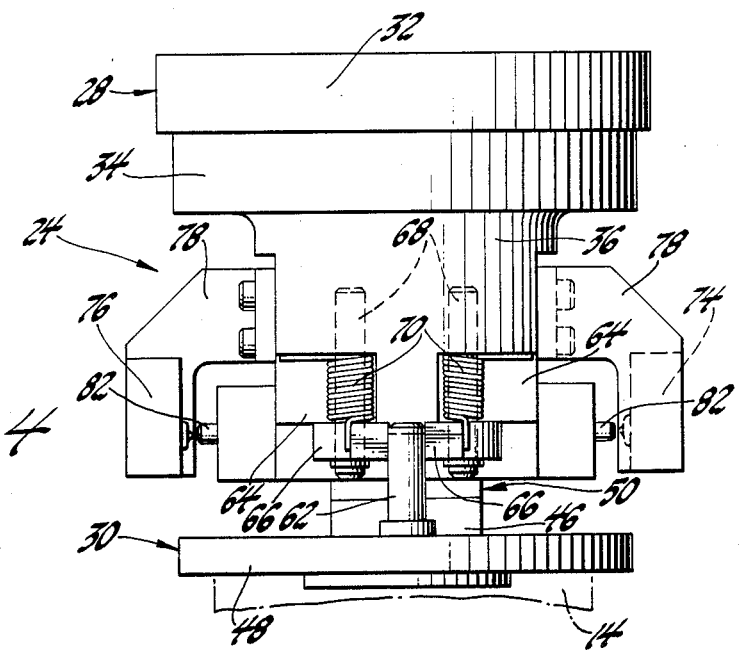
Figure 5:
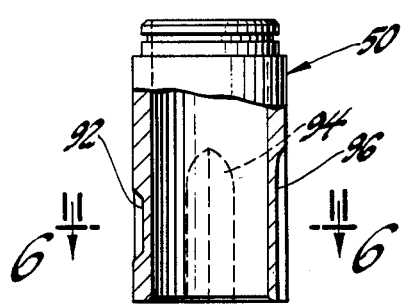
Figure 6:
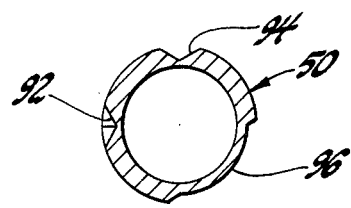

The above and other advantages of the invention will become more apparent from the following specification taken in conjunction with the accompanying drawings wherein:

FIG. 1 is an illustration of a robot performing assembly operations under the supervision of a sensor according to the invention, FIG. 2 is a cross-sectional elevational view of the sensor according to the invention, FIG. 3 is a cross-sectional view of the sensor taken along line 3—3 of FIG. 2, FIG. 4 is a side view of the sensor taken along line 4—4 of FIG. 2, FIG. 5 is a cross-sectional elevational view of the cam of the sensor of FIG. 2, and FIG. 6 is a cross-sectional view of the cam taken along line 6—6 of FIG. 5.

Referring to FIG. 1, a robot 10 having a manipulator arm 12 carries an end effector 14 or gripper which is suitable for picking up parts 16 from a prearranged location on a conveyor or parts feeder 18 and assembling the parts into apertures 20 in other parts or workpieces 22. While many types of assembly operations may be accommodated by the sensor according to the invention, the embodiment described herein is especially designed for an operation requiring a linear movement such as a part insertion combined with a rotary movement such as coupling a bayonet connector or assembling a threaded fastener. Specifically, two degrees of freedom of gripper 14 motion are required and so the specific embodiment is directed to a feedback sensor 24 which monitors two degrees of freedom of gripper movement. The sensor 24 is mounted between the manipulator arm 12 and the gripper or end effector 14 and thus not only monitors the performance of the gripper but transfers the required work force from the manipulator arm to the gripper and hence to the part 16. Sensor output signals are fed back to the robot controller over electrical cable 26. It is evident that if during the assembly operation there were a failure of the part 16 to enter the aperture 20, or a failure of the part 16 to turn in the aperture 20 by a preprogrammed amount, the sensing of either failure mode would be sufficient to detect any improper assembly of the parts. Moreover, immediate detection of the failure may prevent damage to the manipulator or the gripper, e.g., if the aperture 20 were absent from the workpiece 22 an attempt to force the part 16 into the workpiece 22 may cause damage. However, by immediate detection of the insertion failure the robot 10 or other manipulator controller may be signalled to stop the manipulator advance to prevent such damage. Moreover, if sufficient information on the nature of the assembly problem is available to the controller then the robot may be programmed to automatically extricate itself from the problem and then to continue its performance on the same or another workpiece.

It is also evident that while the feedback sensor is useful with a robot type of manipulator it is also useful for the same purpose on less elegant and more commonplace manipulators such as pick and place machines which are used for simple assembly operations. Thus the term "manipulator" as used herein is by no means limited to robotic manipulators and likewise the term "end effector", while illustrated as a gripper, may be any tool for performing an operation such as a screw driver or socket wrench or an applicator of some sort. While the emphasis of the preferred embodiment of the invention is on an assembly operation it will be seen that the sensor is not limited in its usefulness to assembly procedures but rather it is applicable wherever a manipulator may move a part or a tool to a desired location and meet resistance to movement along its programmed path.

As shown in FIGS. 2, 3 and 4, the feedback sensor 24 comprises an upper input section 28 and a lower output section 30 which fit together in telescoping and rotational relationship. The input section 28 has an adapter plate 32 which provides an interface between the tool plate of the manipulator and the sensor 24. The adapter plate 32 is bolted to the flange 34 of a hollow cylindrical body 36 formed of aluminum which has its inner bore fitted with a bronze sleeve bearing 38. The cylindrical body 36 extends downwardly from the flange 34 as viewed in FIG. 2. The bore within the body portion is stepped, being larger at the upper end corresponding to the region of the flange 34 thereby forming a shoulder 40. A spring retainer 42 of aluminum spans the upper end of the bore of the body 36 and is thus located between the adapter plate 32 and the cylindrical body 36.

The output section 30 of the sensor includes a tubular aluminum body 46 integral with a lower radially extending flange 48. The lower flange 48 serves as a second adapter plate to which the end effector 14 is mounted. A steel sleeve 50 surrounds the tubular portion 46 and is secured thereto for movement therewith, and is sized to fit within the bronze sleeve bearing 38 of the upper section so that the two sections are journalled to allow axial movement as well as relatively rotary movement. The tubular portion 46 includes an internally threaded lower bore portion 51 and an upper smooth bore portion 52 of larger diameter so that a shoulder is formed at the interface of the two bores. A disc 54 slidably mounts within the bore 52 and can seat against that shoulder, however, a screw 56 within the threaded bore 51 can be adjusted to move the disc 54 upwardly away from the shoulder. A compression spring 58 fits within the bore 52 and seats at one end on the sliding disc 54 and on the other end at the spring retainer 42 so that the upper and lower sections of the sensor are biased apart by the spring 58. Adjustment of the screw 56 adjusts the compression of the spring 58 for establishing the force required to initiate axial compression of the output section within the input section. A snap ring 60 assembled to a groove in the top of the steel sleeve 50 limits the downward movement of the output section relative to the input section.

A pin 62 secured to the flange 48 of the output section extends in the axial direction to a point opposite the outer surface of the tubular portion 36 of the input section. A pair of pockets 64 formed in the outer wall of the tubular portion 36 of the input section receive a pair of fingers 66 which extend outwardly from the input section to engage and straddle the pin 62. Each finger 66 is mounted for pivotal movement on a pin 68 which extends in the axial direction and is threaded into the tubular portion 36. A torsion spring 70 surrounding each pin 68 biases each finger 66 against the pin 62. In this manner torque in either direction is transmitted from the input section to the output section through the fingers 66 and the pin 62. So long as the torque to be transmitted does not overcome the force of the torsion springs 70 the output section will, in the rotary sense, move in concert with the input section. However, if that force or load level is exceeded, then the spring force is overcome to allow pivoting of one of the fingers so that relative rotation occurs between the input and output sections. Thus, through the agency of the spring members 58 and 70 acting as restraints axial and rotational forces are transmitted between the input and output sections of the sensor; as long as the spring forces are not overcome the input and output sections will move together as one body. However, if either of these restraining spring forces are overcome then either axial or rotary relative motion will occur between the two sections.

To sense any relative movement between the two sections, three switches 72, 74 and 76, preferably of the dry contact microswitch variety, are mounted on the tubular portion 36 of the input section. The switch 72 is mounted diametrically opposite the pin 62. The switch 74 is mounted at 90° from the switch 72 in one direction and the switch 76 is located diametrically opposite the switch 74. Each switch is secured to the tubular portion 36 by a bracket 78. Three bores 80, aligned with the three switches 72, 74 and 76 extend radially through the tubular portion 36 and associated bronze sleeve bearing 38, and a sliding pin 82 in each bore 80 extends from the respective switch to the steel sleeve 50 mounted on the output section. Each pin 82 has an enlarged cam follower head 84 terminating in a hemispherical cam follower surface and a smaller diameter stem portion 86 which extends toward the respective switch through a reduced outer bore section 88. A spring 90 in each bore 80 between the enlarged head 84 and the reduced bore section urges each pin toward the steel sleeve 50.

As best shown in FIGS. 5 and 6 the steel sleeve 50 contains three grooves with ramped sides which serve as cam surfaces and are so located that when the input and output sections are in normal relationship, i.e., in a zero displacement configuration, the cam follower 84 for each switch will seat within one of the grooves. The first groove 92 is aligned with the switch 72 and elongated in the axial direction so that a limited amount of axial movement of the output section in the input section can occur without causing movement of the associated pin 82 toward the switch 72. If, however, that limited amount of movement is exceeded, then the pin rides up the ramped end of the groove to actuate the switch 72. There is a small amount of play between each pin and its associated switch so that switch actuation occurs when the cam follower ramps partially up the side of the groove.

Since the groove 92 is narrow only a slight amount of relative motion in the rotary direction is required for operation of switch 72. The groove 94 in the sleeve 50 in line with the switch 74 is similar to the groove 92 except that it extends in the axial direction throughout the entire range of relative axial movement of the two sections. Thus, the switch 74 will not respond at all to such axial movement but it will respond to a slight amount of rotary movement. The groove 96 which is positioned for operation of the switch 76 extends circumferentially about 90° in one direction from the normal position of the pin for that switch so that any relative rotation between the input and output sections which allows the pin to remain within the groove will not actuate the switch, however, a very slight rotation in the other direction from the normal position will cause actuation of switch 76. The groove 96 is elongated in the axial direction so that axial movement will not cause the actuation of the switch 76.

The switch logic is such that operation of the switch 72 indicates that relative movement between the input and output sections has exceeded desired limits thereby signifying that the assembly operation or other required performance of the manipulator has met with interference. This is a signal for the manipulator to stop movement. Switch 72 is termed the master switch since it is the only one which must be monitored to detect a performance problem. The other two switches are useful in defining the type of motion which gave rise to the problem. The switch 74 is actuated only upon relative rotary movement. Thus, if the master switch 72 is actuated and the switch 74 is not, then it is relative axial movement of the input and output sections which triggered the fault signal. In that case, it is not necessary to interrogate the switch 76 since it can yield no further information about the axial movement. On the other hand, if both the switches 72 and 74 are actuated, that indicates that rotary relative movement triggered the fault signal and switch 76 indicates whether the movement was clockwise or counterclockwise. When a manipulator is driven by a programmable controller, a program can be established to stop the manipulator motion and then perform the necessary movements to extricate the manipulator from the problem defined by the three switch signals. When the manipulator retracts from the interference problem, the sensor is reset to its normal position by the springs 58 and 70. Then under programmed control, the manipulator may continue with its normal tasks. In the event the manipulator control is insufficient to automatically respond to the sensor signals, other than to stop upon receipt of a signal from the master switch, then the signals may be used to illuminate indicators to reveal the nature of the problem.

It will thus be seen that the feedback sensor according to the invention provides a rugged, lightweight and compact device for monitoring operations performed by a manipulator and in particular is effective to monitor at least two degrees of freedom of manipulator motion. Other embodiments within the spirit of the invention may be designed to sense abnormal loads about or along other axes and to monitor more than two degrees of freedom.

The embodments of the invention in which an exclusive property or privilege is claimed are defined as follows:

1. A sensor for monitoring operations performed by a manipulator which drives an end effector through at least two degrees of freedom, the sensor comprising:
    input and output sections between and mounted to the manipulator and the end effector respectively for transmitting forces to the end effector, the output section having a generally cylindrical portion, the input section having a bore for receiving the cylindrical portion for axial and rotational motion in the bore,
    first spring means acting between the input and output sections for maintaining the output section in a normal axial position unless overcome by a predetermined axial load, second spring means acting between the input and output sections for maintaining the output section in a normal rotary position unless overcome by a predetermined torque,
    first, second, and third switches mounted on the input section, and
    cam means carried by the output section for movement therewith and operatively connected to the switches including a first cam for operating the first switch whenever the output section moves from a normal position in either the axial or rotary sense to yield an indication of an abnormal position, a second cam for operating the second switch when the output section moves from the normal position in the rotary sense to yield information on the mode of any abnormal position, and a third cam for operating the third switch when the output section rotates in a given direction from the normal rotary position to yield information on the direction of any abnormal rotation.

2. A sensor for monitoring operations performed by a manipulator which drives an end effector through at least two degrees of freedom, the sensor comprising;
    input and output sections between and mounted to the manipulator and the end effector respectively for transmitting forces to the end effector and for allowing axial and rotational motion,
    spring means acting between the input and output sections for maintaining the output section in a normal axial position unless overcome by a predetermined axial load, and in a normal rotary position unless overcome by a predetermined torque,
    first, second, and third switches mounted on one of the sections, and cam means carried by the other of the sections for movement therewith and operatively connected to the switches including a first cam for operating the first switch whenever the output section moves from a normal position in either axial or rotary sense to yield an indication of an abnormal position, a second cam for operating the second switch when the output section moves from the normal position in the rotary sense to yield information on the mode of any abnormal position, and a third cam for operating the third switch when the output section rotates in a given direction from the normal rotary position to yield information on the direction of any abnormal rotation.

* * * * *